United States Patent [19]

Nishimura et al.

[11] Patent Number: 5,000,542
[45] Date of Patent: Mar. 19, 1991

[54] OPTICAL TYPE ENCODER

[75] Inventors: Tetsuharu Nishimura, Kawasaki; Masaaki Tsukiji; Satoshi Ishii, both of Tokyo; Koh Ishizuka, Urawa; Yoichi Kubota, Kawasaki, all of Japan

[73] Assignee: Canon Kabushiki Kaisha, Tokyo, Japan

[21] Appl. No.: 346,701

[22] Filed: May 3, 1989

[30] Foreign Application Priority Data

May 10, 1988 [JP] Japan .................................. 63-113081

[51] Int. Cl.$^5$ ............................................. G02B 27/02
[52] U.S. Cl. .................................... 350/115; 350/286; 250/237 G; 356/356; 356/354
[58] Field of Search ................................ 350/115, 286; 250/237 G, 231 SE, 556, 557; 356/354, 356, 347

[56] References Cited

U.S. PATENT DOCUMENTS

| | | | |
|---|---|---|---|
| 3,726,595 | 4/1973 | Matsumoto | 356/356 |
| 3,738,753 | 6/1973 | Huntley, Jr. | 356/347 |
| 3,756,723 | 9/1973 | Hock | 356/356 |
| 4,465,366 | 8/1984 | Schmidt | 356/354 |
| 4,596,467 | 6/1986 | Bartelt | 356/356 |
| 4,629,886 | 12/1986 | Akiyama et al. | 250/237 G |
| 4,676,645 | 6/1987 | Taniguchi et al. | 250/237 G |
| 4,930,895 | 6/1990 | Nishimura et al. | 356/356 |

Primary Examiner—Bruce Y. Arnold
Assistant Examiner—Loha Ben
Attorney, Agent, or Firm—Fitzpatrick, Cella, Harper & Scinto

[57] ABSTRACT

In an optical type encoder for projecting a light beam onto an optical type scale having a diffraction grating formed thereon, forming an interferenced light by the use of a diffracted light from the scale, and photoelectrically converting the interferenced light to thereby measure the displacement of the scale, first and second light beams are caused to enter substantially the same position on the scale from different first and second directions, first and second diffracted light beams emerging from the scale by the first and second light beams being diffracted by the scale are directed to the aforementioned position by a reflecting device, the diffracted light beams emerging in the first and second directions by the first and second diffracted light beams being diffracted by the scale are superposed one upon the other to thereby form an interferenced light, and light components created by the first and second light beams being regularly reflected at the aforementioned position are not included in the interferenced light.

21 Claims, 3 Drawing Sheets

1

OPTICAL TYPE ENCODER

BACKGROUND OF THE INVENTION

1. Field of the Invention

This invention relates to an optical type encoder, and in particular to an optical type encoder for illuminating a movable diffraction grating by a light beam, and detecting a phase variation in a diffracted light beam created by the movable diffraction grating which responds to the displacement of the movable diffraction grating, to thereby measure the displacement of the movable diffraction grating.

2. Related Background Art

In recent years, a precise displacement measuring machine capable of measuring the displacement of a movable body in the unit of 1 μm or less (submicron) has been required in a precision instrument such as an NC machine tool or a semiconductor printing apparatus. As such measuring machine capable of measuring the displacement in the unit of submicron, there is well known a rotary encoder or a linear encoder which uses a coherent light beam such as a laser beam to form an interference fringe from a diffracted light beam from a movable body, and effects displacement measurement by a signal obtained by photoelectrically converting the interference fringe.

FIG. 1 of the accompanying drawings shows the construction of an example of the prior-art linear encoder of this type. In FIG. 1, the reference numeral 1 designates a laser, the reference numeral 2 denotes a collimator lens, and the reference numeral 3 designates a diffraction grating of grating pitch p mounted on a moving body, not shown, and moving at a velocity v, for example, in the direction of arrow. The reference numeral 51 and 52 denote quarter wavelength plates, the reference numerals 41 and 42 designate dach-prisms or corner cube reflecting mirrors, the reference numeral 6 denotes a beam splitter, and the reference numerals 71 and 72 designate polarizing plates whose polarization axes are orthogonal to each other and are disposed so as to form an angle of 45° with respect to the polarization axes of the quarter wavelength plates 51 and 52. Numerals 81 and 82 respectively denote a light receiving element.

In FIG. 1, the light beam from the laser 1 is made into a substantially parallel light beam by the collimator lens 2 and enters the diffraction grating 3. Positive and negative mth-order diffracted light beams diffracted by the diffraction grating 3 again enters the diffraction grating 3 through the quarter wavelength plates 51 and 52, respectively, and through the corner cube reflecting mirrors 41 and 42, respectively, and become positive and negative mth-order re-diffracted light beams and overlap each other, and this overlapping light is divided into two light beams by the beam splitter 6, and the divided two light beams enter the light receiving elements 81 and 82 through the polarizing plates 71 and 72.

The so-called interferenced light beams entering the light receiving elements 81 and 82 are given a phase difference of 90° therebetween by a combination of the quarter wavelength plates 51, 52 and the polarizing plates 71, 72, and are used for the discrimination of the direction of movement of the diffraction grating 3. The pulse number of a signal obtained by photoelectrically converting the interference fringe received by the light receiving elements 81 and 82 is counted to thereby find the amount of movement of the diffraction grating 3.

Numerous such optical type encoders utilizing the interference of diffracted light beams are shown, for example, in U.S. Pat. No. 3,726,595, 3,738,753, 3,756,723, 3,891,321, 4,629,886, 4,676,645, Japanese Laid-Open Patent Applications Nos. 58-191906, 58-191907, 60-190812, 61-65165, 61-178613, 61-212728, 62-6119 and 62-12814. However, these prior-art optical type encoders have tended to become complicated in construction if an attempt is made to enhance their resolving power and therefore, the applicant has proposed an optical type encoder which is simple and has a high resolving power in U.S. application Ser. No. 204,727, now U.S. Pat. No. 4,930,895.

SUMMARY OF THE INVENTION

The present invention is concerned with improvements in the previously proposed optical type encoder, and an object thereof is to provide an optical type encoder improved in measurement accuracy.

To achieve this object, the optical type encoder of the present invention is an optical type encoder for projecting a light beam onto an optical type scale having a diffraction grating formed thereon, forming an interference fringe by the use of diffracted light from said scale, and photoelectrically converting said interference fringe to thereby measure the displacement of said scale, characterized in that first and second light beams are caused to obliquely enter substantially the same position on said scale from different first and second directions, first and second diffracted light beams emerging from said scale by said light beams being diffracted by said scale are directed to said position by reflecting means, the diffracted light beams emerging in said first and second directions by said first and second diffracted light beams being diffracted by said scale are superposed one upon the other to thereby form interferenced light, and light components created by said first and second light beams being regularly reflected at said position are not included in said interferenced light. By adopting such a construction, the interference fringe formed by the interferenced light is made clear-cut to thereby improve measurement accuracy.

Further features and specific forms of the present invention are described in some embodiments which will hereinafter be described.

DESCRIPTION OF THE PREFERRED EMBODIMENTS

Figure 1:
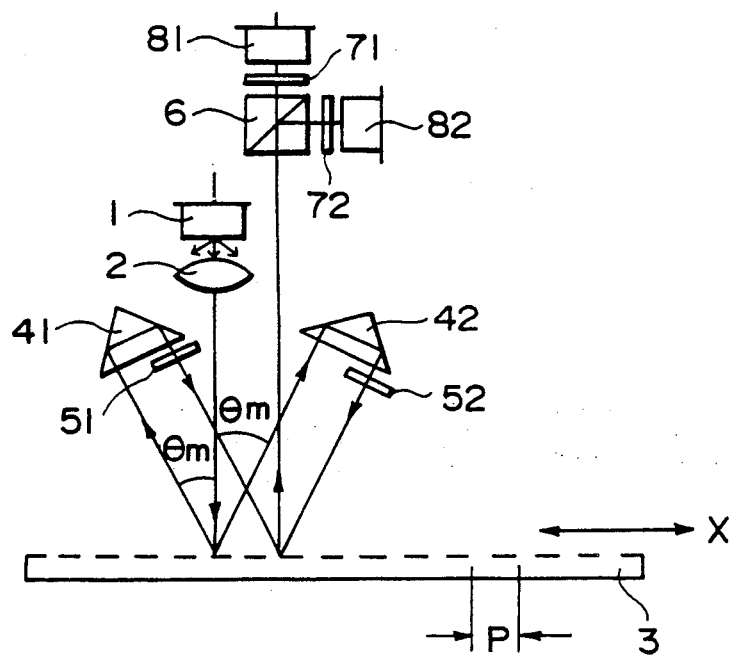
FIG. 1 is a schematic view showing an example of the prior-art optical type encoder.
Figure 2:
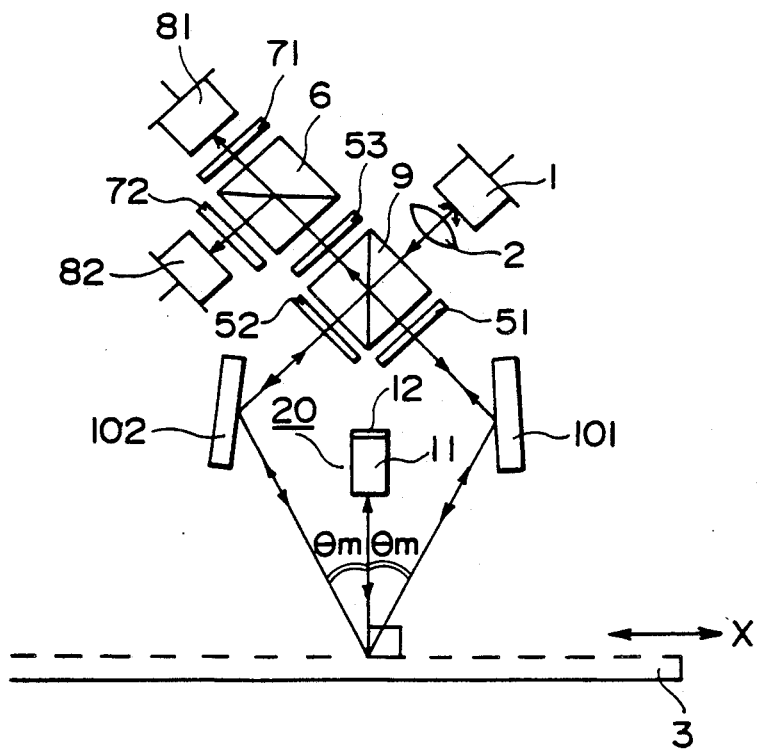
FIG. 2 is a schematic view showing an embodiment of the present invention.

FIG. 2 is a schematic view of an optical system according to an embodiment of the present invention. In FIG. 2, elements similar to those shown in FIG. 1 are given similar reference numerals. In FIG. 2, the reference numeral 9 designates a polarizing beam splitter, and the reference numerals 51 and 52 denote quarter wavelength plates. The quarter wavelength plates 51 and 52, as will be described later, are disposed so that the advanced phase axes thereof face in the same direction relative to the incident light beam and face in predetermined directions relative to the polarizing beam splitter 9. The reference numerals 101 and 102 designate reflecting mirrors, and the reference numeral 11 denotes an index gradient type lens of the end surface imaging type which is provided with a reflecting film 12 on one end thereof. The lens 11 and the reflecting film 12 together constitute a reflecting system 20.

A laser 1 used in the present embodiment is a semiconductor laser (a laser diode), and the use of such a compact laser achieves the compactness of the apparatus. The type of the semiconductor laser may be of the single mode or of the multi-mode. A diffraction grating 3 is formed on a linear scale, and the diffraction grating 3 also may be of the amplitude type or the phase type.

In the present embodiment, the rectilinearly polarized light beam, i.e., the coherent light beam, from the laser 1 is made into a substantially parallel light beam by a collimator lens 2, is caused to enter the polarizing beam splitter 9 and is divided into a rectilinearly polarized transmitted light beam (P-polarized light) and a rectilinearly polarized reflected light beam (S-polarized light) by the polarizing beam splitter 9. The mounted position of the laser 1 is adjusted so that at this time, the rectilinear polarization azimuth of the laser beam from the laser 1 is 45° with respect to the polarization azimuth of the polarizing beam splitter 9. Thereby the intensity ratio between the transmitted light beam and the reflected light beam from the polarizing beam splitter 9 becomes approximately 1:1. Instead of adopting such a construction, a quarter wavelength plate may be provided in the optical path of the laser beam from the laser 1 and the laser beam may be converted into a circularly polarized light by the action of this quarter wavelength plate and may be caused to enter the polarizing beam splitter 9.

The reflected light beam and the transmitted light beam from the polarizing beam splitter 9 are converted from rectilinearly polarized light beams into circularly polarized light beams through the quarter wavelength plates 51 and 52, are reflected by the reflecting mirrors 101 and 102 and enter the diffraction grating 3. The angle of incidence of each light beam at this time is set so that the mth-order diffracted light by each light beam from the diffraction grating is reflected substantially perpendicularly from the diffraction grating 3 and emerges therefrom.

That is, each light beam is caused to enter the diffraction grating 3 so that $$\theta m \approx \sin^{-1}(m\lambda/P) \ (m = \pm 1, \pm 2, \ldots) \quad (1)$$

where P is the grating pitch of the diffraction grating 3, $\lambda$ is the wavelength of the laser beam, m is an integer and $\theta m$ is the angle of incidence of the laser beam onto the diffraction grating 3.

Incidentally, in the present embodiment, m is set to $m = \pm 1$, and the reflected light beam reflected by the polarizing beam splitter 9 is directed to the diffraction grating 3 at an angle of incidence $\theta_1$ and the transmitted light beam transmitted through the polarizing beam splitter 9 is directed to the diffraction grating 3 at an angle of incidence $-\theta_1$, whereby the +1st-order reflected diffracted light created by the reflected light beam being diffracted and the −1st-order reflected diffracted light created by the transmitted light beam being diffracted emerge substantially perpendicularly from the diffraction grating 3.

Figure 3:
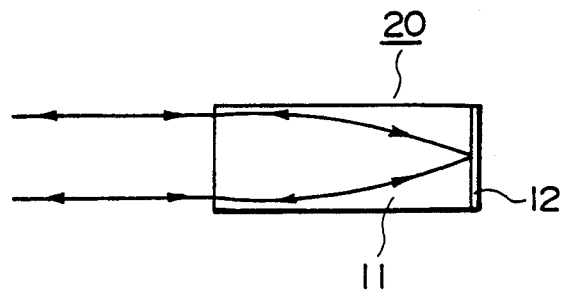
FIG. 3 is a cross-sectional view of a reflecting element shown in FIG. 2.

The mth-order diffracted light beams ($m = \pm 1$) having emerged substantially perpendicularly from the diffraction grating 3 enter the lens 11. The reflecting film 12 is provided near the focal plane, i.e., on the end surface, of the lens 11 and therefore, each diffracted light beam having entered the lens 11 is reflected by the reflecting film 12 as shown in FIG. 3, whereafter it returns along the original optical path and emerges from the lens 11, and again enters the diffraction grating 3 perpendicularly thereto.

Each of the diffracted light beams is again diffracted by the diffraction grating 3, and the mth-order reflected diffracted light beams ($m = \pm 1$) resulting therefrom return along the original optical paths, are reflected by the reflecting mirrors 101 and 102, are transmitted through the quarter wavelength plates 51 and 52 and again enter the polarizing beam splitter 9.

In this manner, in the present embodiment, the optical paths of the reflected light beam and the transmitted light beam from the polarizing beam splitter 9 which are used for measurement are designed such that the reflected light beam travels along a first optical path formed by the polarizing beam splitter 9, the reflecting mirror 101, the diffraction grating 3 and the reflecting system 20 and the transmitted light travels along a second optical path formed by the polarizing beam splitter 9, the reflecting mirror 102, the diffraction grating 3 and the reflecting system 20, and a third optical path between the diffraction grating and the reflecting system 20 is made common to the two light beams, thereby achieving the simplification and compactness of the system. Also, as previously described, both of the reflected light beam and the transmitted light beam are diffracted twice by the diffraction grating 3, but they travel back along their respective original optical paths, that is, the reflected light beam (+1st-order diffracted light) travels back along the first optical path and the transmitted light beam (−1st-order diffracted light) travels back along the second optical path. Here, the lengths of the first optical path and the second optical path are equal to each other.

Now, as previously described, the re-diffracted light beams enter the quarter wavelength plates 51 and 52, respectively, and therefore, the reflected and transmitted light beams reciprocally travel through the quarter wavelength plates 51 and 52, respectively. Accordingly, the reflected light beam reflected at first by the polarizing beam splitter 9 becomes P-polarized light whose polarization azimuth differs by 90° from the initial polarization azimuth relative to the polarizing beam splitter 9 when it again enters the beam splitter 9, and therefore it is transmitted through the polarizing beam splitter 9. Conversely, the transmitted light beam transmitted at first through the polarizing beam splitter 9 becomes S-polarized light and therefore, it is reflected by the polarizing beam splitter 9 when it again enters the beam splitter 9.

In this manner, the two re-diffracted light beams are superposed one upon the other by the polarizing beam splitter 9 and are made into opposite circularly polarized lights through the quarter wavelength plate 53, and such a coherent light is divided into two light beams by a beam splitter 6, and these light beams are made into rectilinearly polarized light beams through polarizing plates 71 and 72, respectively, and are caused to enter light receiving elements 81 and 82, respectively.

The angle $\theta m$ of the formula (1) may be within such a degree of range that the diffracted light can enter the reflecting element 20 and again enter the diffraction grating 3.

In the present embodiment, when the diffraction grating is moved by one pitch, the phase of the mth-order diffracted light beams varies by $2m\pi$. Accordingly, the light receiving elements 81 and 82 photoelectrically convert the interference fringe caused by the light beams subjected twice to the positive and negative mth-order diffractions and therefore, when the diffraction grating is moved by an amount corresponding to one pitch of the grating, there are obtained 4m sine wave signals.

For example, assuming that the grating pitch P of the diffraction grating 3 is $P = 3.2$ $\mu m$ and the 1st-order ($m = \pm 1$) diffracted light is utilized as the diffracted light, when the diffraction grating 3 is moved by 3.2 $\mu m$, there are obtained four sine wave signals from each of the light receiving elements 81 and 82. Accordingly, ¼ of the pitch of the diffraction grating 3, i.e., $3.2/4 = 0.8$ $\mu m$, is obtained as the resolving power.

Figure 4:
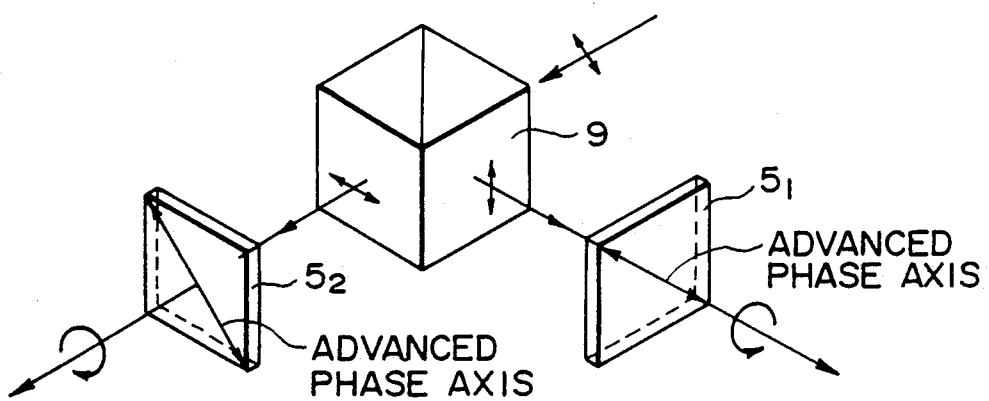
FIG. 4 is a schematic view showing the arrangement of the quarter wavelength plates of the FIG. 2 encoder.

FIG. 4 is an illustration showing the relation between the polarization azimuth of the polarizing beam splitter 9 and the advanced phase axes (the faster axes) of the quarter wavelength plates 51 and 52. As shown in FIG. 4, the quarter wavelength plates 51 and 52 have their advanced phase axes (faster axes) set in the direction of 45° with respect to the polarization azimuths of the rectilinearly polarized light beams reflected from and transmitted through the polarizing beam splitter 9, and the advanced phase axes of the quarter wavelength plates 51 and 52 are set in the same direction relative to the incident light beam. That is, the light beam reflected by the polarizing beam splitter 9 is transmitted through the quarter wavelength plate 51 and becomes a righthanded circularly polarized light beam and enters the diffraction grating 3, and when the mth-order re-diffracted light beam reflected by the reflecting system 20 and created by the diffraction grating 3 is transmitted through the quarter wavelength plate 51, it becomes a rectilinearly polarized light beam vibrating in a direction orthogonal to the direction of polarization in the forward path and is transmitted through the polarizing beam splitter 9, and is directed to the light receiving elements 81 and 82.

On the other hand, the light beam transmitted at first through the polarizing beam splitter 9 is transmitted through the quarter wavelength plate 52 and becomes a lefthanded circularly polarized light and enters the diffraction grating 3, and when the $-$mth-order re-diffracted light reflected by the reflecting system 20 and created by the diffraction grating 3 is transmitted through the quarter wavelength plate 52, it becomes a rectilineary polarized light beam in a direction orthogonal to the direction of polarization in the forward path and is reflected by the polarizing beam splitter 9, and is directed to the light receiving elements 81 and 82. When the two light beams are caused to enter the diffraction grating 3 at the angle $\theta m$ represented by the formula (1), the regularly reflected light (0-order reflected diffracted light) of each light beam by the diffraction grating 3 overlaps the optical path of the $\pm$mth-order re-diffracted light and enters the polarizing beam splitter 9. In the present embodiment, the advanced phase axes of the quarter wavelength plates 51 and 52 are set in the same direction and therefore, the light beam reflected at first by the polarizing beam splitter 9 and transmitted through the quarter wavelength plate 51 and becoming a righthanded circularly polarized light beam and entering the diffraction grating 3 and regularly reflected thereby, when transmitted through the quarter wavelength plate 52, becomes a rectilinearly polarized light beam (P-polarized light) polarized in a direction orthogonal to the direction of polarization when it has entered the quarter wavelength plate 51 and thus, this rectilinearly polarized light beam is transmitted through the polarizing beam splitter 9. Accordingly, this light beam does not enter the light receiving elements 81 and 82. The light beam transmitted at first through the polarizing beam splitter 9 and having entered the diffraction grating 3 and regularly reflected thereby neither enters the light receiving elements 81 and 82.

Further, of the several diffracted light beams created by the diffracted light beams reflected by the reflecting system 20 entering the diffraction grating 3, the $-$mth-order diffracted light beam opposite in sign to the mth-order diffracted light beam travelling back along the forward path enters the optical path on the opposite side and enters the polarizing beam splitter 9, but by the advanced phase axes of the quarter wavelength plates 51 and, 52 being set as previously described, these light beams like said regularly reflected light beam are prevented from entering the light receiving elements 81 and 82. That is, by the advanced phase axes of the quarter wavelength plates 51 and 52 being set in the same direction, only the $\pm$mth-order re-diffracted lights which are signal light beams used for measurement enter the light receiving elements 81 and 82, and each regularly reflected light beam, the light subjected to the $-$mth-order diffraction after the mth-order diffraction and the light beam subjected to the $+$mth-order diffraction after the $-$mth-order diffraction do not enter the light receiving elements 81 and 82. Accordingly, in the present embodiment, the S/N ratio of the output signals of the light receiving elements can be improved and highly accurate detection is made possible.

The reflecting system 20 in the present embodiment is a so-called cat's eye optical system in which a reflecting surface is disposed near the focal plane and therefore, even if for example, the angle of diffraction of the diffracted light beam varies with a variation in the oscillation wavelength of the laser beam and the angle of incidence onto the condensing lens 11 varies more or less, the diffracted light beam can be returned to the diffraction grating 3 substantially along the same optical path. Thereby the two positive and negative diffracted light beams can be accurately superposed one upon the other and a reduction in the S/N ratio of the output signals of the light receiving elements 81 and 82 is prevented.

Also, in the present embodiment, the compactness of the entire apparatus is achieved by setting the angle of incidence of the laser light onto the diffraction grating 3 as previously described and by using the reflecting system 20.

For example, if the grating pitch of the diffraction grating is 3.2 $\mu m$ and the wavelength of the laser light is 0.78 $\mu$, the angle of diffraction of the $\pm$1st-order diffracted light beams is 14.2° as previously mentioned.

So, where an index gradient type lens having a diameter of the order of 2 mm is used as the lens 11 and only the ±1st-order diffracted light beams are reflected, the distance from the diffraction grating 3 to the lens 11 is 2/tan 14.2°=7.9 mm, and these two members may be spaced apart from each other by the order of 8 mm and thus, the entire apparatus can be constructed very compactly.

Figure 5:
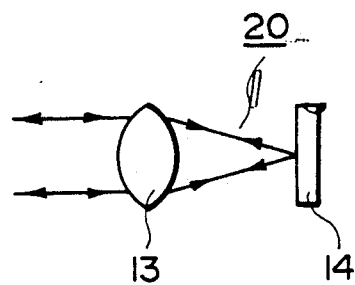
FIG. 5 is a cross-sectional view showing another embodiment of the reflecting element.

Although the reflecting system 20 using an index gradient type lens as the lens 11 is used in the present embodiment, the reflecting system 20 may also be constructed of a combination of an ordinary lens 13 and a reflecting mirror 14 as shown in FIG. 5.

Figure 6:
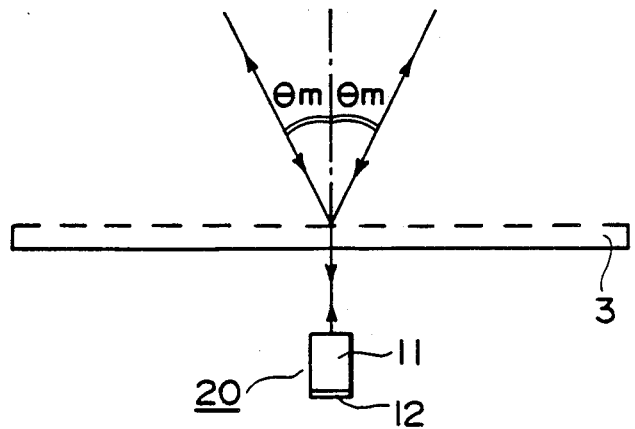
FIG. 6 is a schematic view showing modified one of the embodiment as shown in FIG. 2.

Also, in the present embodiment, an interferenced light beams is formed by the use of a reflected diffracted light beams, but alternatively, as shown in FIG. 6, the reflecting system 20 may be disposed below the diffraction grating 3 and an interferenced light beams may be formed by the utilization of a transmitted diffracted light beams.

Figure 7:
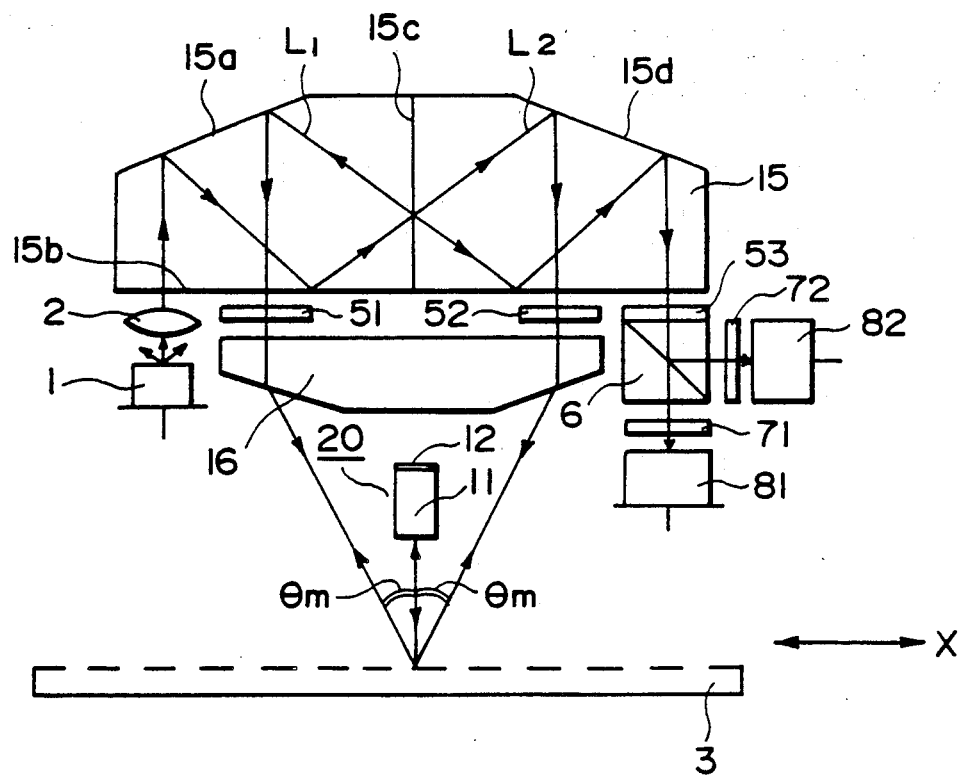
FIG. 7 is a schematic view showing another embodiment of the present invention.

FIG. 7 shows another embodiment of the present invention. In FIG. 7, elements similar to those shown in FIGS. 1 and 2 are given similar reference numerals. In FIG. 6, the reference numeral 15 designates a polarizing prism having the same function as the polarizing beam splitter 9 in the embodiment of FIG. 2. The reference numeral 16 denotes a turn-back prism having the same function as the combination of the reflecting mirrors 101 and 102 in the embodiment of FIG. 2.

In the present embodiment, the laser beam from the laser 1 is made into a substantially parallel light beam by the collimator lens 2 and is caused to enter the polarizing prism 15. The light beam having entered the polarizing prism 15 is reflected by the reflecting surfaces 15a and 15b thereof, whereafter it is divided into a reflected light beam L1 and a transmitted light beam L2 by the polarizing beam dividing surface 15c of the polarizing prism 15. The reflected light beam L1 and the transmitted light beam L2 are reflected by the reflecting surfaces 15a and 15d, respectively, of the prism 15, and emerge from the surface 15b and are transmitted through the quarter wavelength plates 51 and 52, whereafter they are refracted at a predetermined angle by the turn-back prism 16, and enter the diffraction grating 3 at such angles of incidence that satisfy the aforementioned condition.

Reflected diffracted light beams of predetermined order created by the respective light beams being diffracted by the diffraction grating 3 are caused to enter the diffraction grating 3 again through the reflecting system 20, and the two re-diffracted light beams from the diffraction grating 3 are superposed one upon the other through the turn-back prism 16 and the polarizing prism 15, and are transmitted through a quarter wavelength plate 53 as in the embodiment of FIG. 2 and are thereby made into an interferenced light, which is divided into two light beams by the beam splitter 6, and the divided light beams are passed through the polarizing plates 71 and 72, respectively, whereafter they are received by the light receiving elements 81 and 82, respectively.

Again in the present embodiment, the advanced phase axes of the quarter wavelength plates 51 and 52 face in the same direction with respect to the incident light and therefore, light beams regularly reflected by the diffraction grating 3, i.e., the light beams passing through the aforementioned first and second optical paths, are not included in the interferenced light beam, forming an interference fringe. Accordingly, a clear-cut interference fringe (the interference fringe formed in the present embodiment and the previous embodiment is of one color) can be formed, and it is possible to improve the S/N ratio of the signals.

As described above, in each of the above-described embodiments, a light beam is divided into two rectilinearly polarized light beams by the polarizing beam splitter, whereafter these two light beams are passed through the quarter wavelength plates whose advanced phase axes face in the same predetermined direction, whereafter the angles of incidence of said two light beams onto the diffraction grating are set as previously described, and a reflecting system for creating re-diffracted light is disposed to thereby prevent the unnecessary light from entering the light receiving elements and thus, there is provided an encoder of high resolving power and high accuracy which is compact as a whole.

While the above embodiments have been described with respect to a linear encoder, the present invention is equally applicable to a rotary encoder.

As an application of the present invention to a rotary encoder, re-diffracted-light beams may be created at predetermined positions on a diffraction grating formed on the circumference of a rotational scale along the direction of rotation thereof, by an optical system as shown, for example, in FIG. 2, and an interferenced light beam may be formed by these re-diffracted light beams. Also, a plurality of such optical systems may be used to create re-diffracted light beams at two locations on the diffraction grating which are point-symmetrical with respect to the center of rotation of the rotational scale, to thereby form interferenced light beams, and the amount of rotation of the rotational scale may be measured on the basis of signals obtained by photoelectrically converting the coherent light beams by the respective optical systems.

Also, the optical system for forming the coherent light beam may assume various forms without departing from the concept of the present invention. Whatever form can obtain an effect equal to that of the encoder shown in FIGS. 2–7.

As described above, in the present invention, design is made such that light beams passed through the first and second optical paths such as the light beams regularly reflected at least by the diffraction grating are not included in the interferenced light beam used for measurement and therefore, the interference fringe formed by the interferenced light beam becomes clear-cut, and the S/N ratio of the signals obtained by photoelectrically converting the same can be improved. Accordingly, it is possible to provide an encoder of high accuracy and high resolving power.

What is claimed is:

1. An optical type coder having a light source for projecting at least one light beam onto a movable optical type scale having a diffraction grating formed thereon, forming interferenced light waves by the use of diffracted light waves from said scale, and photoelectrically converting said interferenced light waves to thereby measure the displacement of said scale, wherein a beam splitter splits said at least one light beam into first and second light beams said first and second light beams being caused by a first reflecting means to enter substantially the same position on said scale from different first and second directions, first and second diffracted light beams emerging from said scale at said position are received by a second reflecting means and are directed to said position by said second reflecting means, and the first and second diffracted light beams, emerging in said first and second directions by said first and second light beams being diffracted by said scale, are superposed one upon the other to thereby form interferenced light waves, and wherein light components created by said first and second light beams being regularly reflected at said position are not included in said interferenced light waves.

2. An optical type encoder having:
a light source;
a beam splitter for dividing a light beam from said light source into first and second light beams;
an optical system for causing said first light beam and said second light beam to obliquely enter substantially the same position on a movable diffraction grating from a first direction and a second direction differing from said first direction, respectively, so that said first and second light beams are diffracted by said diffraction grating and first and second diffracted light beams emerge from said diffraction grating in predetermined directions;
reflecting means for retroflecting said first and second diffracted light beams and directing them to said position to thereby diffract said first and second diffracted light beams by said diffraction grating and cause a first re-diffracted light beam and a second re-diffracted light beam to emerge in said first direction and said second direction, respectively; and
light receiving means for receiving said first and second re-diffracted light beams through said optical systems and said beam splitter, said light receiving means photoelectrically converting interference light waves formed by said first and second re-diffracted light beams and outputting a signal conforming to a displacement of said diffraction grating, said optical system and said beam splitter being designed such that light components created by said first and second light beams being regularly reflected by said diffraction grating are not directed to said light receiving means.

3. An encoder according to claim 2, wherein said beam splitter is a polarizing beam splitter.

4. An encoder according to claim 3, wherein said optical system has a first quarter wavelength plate provided in the optical path of said first light beam, and a second quarter wavelength plate provided in the optical path of said second light beam, the direction of the advanced phase axis of said second quarter wavelength plate for said second light beam being substantially equal to the direction of the advanced phase axis of said first quarter wavelength plate for said first light beam.

5. An encoder according to claim 4, wherein said optical system further has a first reflecting mirror disposed in the optical path between said first quarter wavelength plate and said diffraction grating for reflecting said first light beam, and a second reflecting mirror disposed in the optical path between said second quarter wavelength plate and said diffraction grating for reflecting said second light beam, and said first and second mirrors determine the angles of incidence of said first and second light beams onto said diffraction grating.

6. An encoder according to claim 2, wherein said light source includes a semiconductor laser.

7. An encoder according to claim 2, wherein said light receiving means has a second beam splitter for dividing said interferenced light waves into first and second interferenced light beams, a first light receiving element for receiving said first interferenced light beam, and a second light receiving element for receiving said second interferenced light beam.

8. An optical type encoder for optically measuring the displacement of a movable scale having a diffraction grating formed thereon, having:
a laser;
a polarizing beam splitter provided in the optical path of laser light emitted from said laser;
an optical system for illuminating said scale by a reflected light beam and a transmitted light beam from said polarizing beam splitter, said optical system causing said reflected light beam to enter a predetermined position on said scale at an angle of incidence $\theta$ and causing said transmitted light beam to enter said predetermined position at an angle of incidence $-\theta$;
a reflecting system for reflecting first and second diffracted light beams created by said reflected light beam and said transmitted light beam being diffracted by the diffraction grating of said scale and emerging from said diffraction grating, and directing them to said predetermined position to thereby cause a first re-diffracted light beam to emerge from said predetermined position at said angle $\theta$ and cause a second re-diffracted light beam to emerge from said predetermined position at said angle $-\theta$;
a first photodetector for receiving said first and second re-diffracted beams superposed one upon the other through said optical system and said polarizing beams splitter, through an analyzer, said first photodetector outputting a signal conforming to a displacement of said scale; and
first and second quarter wavelength plates provided in the optical paths, respectively, of said reflected light beam and said transmitted light beam in said optical system, the direction of the advanced phase axis of said first quarter wavelength plate for said reflected light beams and the direction of the advanced phase axis of said second quarter wavelength plate for said transmitted light beam being substantially equal to each other.

9. An encoder according to claim 8, wherein said laser is a semiconductor laser, and a collimator lens for collimating the laser light from said laser is provided between said laser and said polarizing beam splitter.

10. An encoder according to claim 8, wherein said optical system has a first mirror for reflecting said reflected light beam and directing it to said scale, and a second mirror for reflecting said transmitted light beam and directing it to said scale.

11. An encoder according to claim 8, wherein said optical system has a prism having a first inclined surface for refracting said reflected light beam and directing it to said scale and a second inclined surface for refracting said transmitted light beam and directing it to said scale.

12. An encoder according to claim 8, wherein said reflecting system forms a common optical path for said first and second diffracted light beams.

13. An encoder according to claim 12, wherein said optical system causes said reflected light beam and said transmitted light beam to enter said predetermined position so that said first and second diffracted light beams emerge perpendicularly from said scale.

14. An encoder according to claim 13, wherein said reflecting system causes said first and second diffracted light beams to enter said scale perpendicularly thereto.

15. An encoder according to claim 14, wherein said reflecting system has a lens and a reflecting mirror.

16. An encoder according to claim 8, wherein said first and second diffracted light beams are +1st-order diffracted light beams.

17. An encoder according to claim 16, wherein said first re-diffracted light beam is +1st-order re-diffracted light beam created by the +1st-order diffracted light beam being diffracted, and said second re-diffracted light beam is −1st-order re-diffracted light beam created by the −1st-order diffracted light beam being diffracted.

18. An encoder according to claim 8, further having a quarter wavelength plate provided between said polarizing beam splitter and said analyzer.

19. An encoder according to claim 18, further having a half-mirror provided between said first-mentioned analyzer and said quarter wavelength plate, a second analyzer and a second photodetector, said first photodetector receiving the light transmitted through said half-mirror, said second photodetector receiving the light reflected by said half-mirror through said second analyzer, the polarization azimuth of said second analyzer having an inclination of 45° relative to that of said first analyzer, whereby said second photodetector outputs a signal 90° out of phase with the signal from said first photodetector.

20. A displacement measuring apparatus for measuring the displacement of a movable diffraction grating, having:
optical means forming first and second optical paths which intersect each other at said diffraction grating;
light source means for supplying a light beam for illuminating said diffraction grating along each of said optical paths;
light receiving means for receiving first and second diffracted light beams emerging from said diffraction grating in the directions of said first and second optical paths, through said optical means, said light receiving means photoelectrically converting an interference fringe formed by said first and second diffracted light beams and outputting a signal conforming to a displacement of said diffraction grating; and
means for causing any light beam passed through both of said optical paths and said second optical path not to enter said light receiving means.

21. An apparatus according to claim 20, wherein said optical means has a reflecting system cooperating with said diffraction grating to form a third optical path, and said reflecting system reflects a plurality of diffracted light beams created by said diffraction grating and directs them to said diffraction grating, thereby creating said first and second diffracted light beams.

* * * * *

UNITED STATES PATENT AND TRADEMARK OFFICE
CERTIFICATE OF CORRECTION

PATENT NO. : 5,000,542
DATED : March 19, 1991
INVENTOR(S) : TETSUHARU NISHIMURA ET AL.

It is certified that error appears in the above-identified patent and that said Letters Patent is hereby corrected as shown below:

COLUMN 8

Line 55, "coder" should read --encoder--.
　　　Line 63, "beams said" should read --beams, said--.

COLUM 9

Line 23 "retroflecting" should read --retroreflecting--.
　　　Line 33, "systems" should read --system--.

COLUMN 10

Line 34, "beams" should read --beam--.

COLUMN 12

Line 22, "optical paths" should read
　　　　　　--first optical path--.

Signed and Sealed this

Twelfth Day of January, 1993

Attest:

DOUGLAS B. COMER

Attesting Officer　　　Acting Commissioner of Patents and Trademarks